(12) United States Patent
Wu

(10) Patent No.: US 9,669,465 B2
(45) Date of Patent: Jun. 6, 2017

(54) CUTTING APPARATUS FOR A MACHINE TOOL

(71) Applicant: Hsuan-Lung Wu, Taichung (TW)

(72) Inventor: Hsuan-Lung Wu, Taichung (TW)

( * ) Notice: Subject to any disclaimer, the term of this patent is extended or adjusted under 35 U.S.C. 154(b) by 602 days.

(21) Appl. No.: 14/076,787

(22) Filed: Nov. 11, 2013

(65) Prior Publication Data

US 2015/0128774 A1 May 14, 2015

(51) Int. Cl.
| | |
|---|---|
| *B23B 11/00* | (2006.01) |
| *B23B 5/36* | (2006.01) |
| *B23Q 5/10* | (2006.01) |
| *B23Q 5/20* | (2006.01) |
| *B23Q 16/10* | (2006.01) |

(52) U.S. Cl.
CPC ............... *B23B 5/36* (2013.01); *B23Q 5/10* (2013.01); *B23Q 5/20* (2013.01); *B23Q 16/102* (2013.01); *B23B 2270/54* (2013.01); *Y10T 82/13* (2015.01)

(58) Field of Classification Search
CPC .... B23B 2270/54; B23Q 16/102; B23Q 5/10; B23Q 5/20
See application file for complete search history.

(56) References Cited

U.S. PATENT DOCUMENTS

| | | | | | |
|---|---|---|---|---|---|
| 3,059,508 | A * | 10/1962 | Staats | ................... | B23Q 27/006 82/1.3 |
| 4,061,076 | A * | 12/1977 | Robertson | ............. | B23C 5/2291 279/141 |
| 4,204,787 | A * | 5/1980 | McCray | ................. | B23C 5/2291 407/49 |
| 4,413,539 | A * | 11/1983 | Ishizuka | ................... | B23B 3/06 29/36 |
| 5,170,686 | A * | 12/1992 | Schalles | ................ | B23B 13/123 29/37 A |
| 5,542,791 | A * | 8/1996 | Ball | ..................... | B23F 23/1206 407/21 |
| 6,510,769 | B1 * | 1/2003 | Kalinsky | ................ | B23Q 7/042 82/124 |
| 6,815,917 | B2 * | 11/2004 | Fujinawa | ............. | B23Q 15/013 318/560 |
| 7,555,973 | B2 * | 7/2009 | Asahara | .................. | B23B 3/161 82/117 |

* cited by examiner

*Primary Examiner* — Sara Addisu
(74) *Attorney, Agent, or Firm* — McNees Wallace & Nurick LLC

(57) ABSTRACT

A cutting apparatus adapted for use in a machine tool. The cutting apparatus includes a mounting frame. A cutting unit is mounted rotatably in the mounting frame. A locking unit is connected to the mounting frame and the cutting unit, for restraining or permitting relative movement between the mounting frame and the cutting unit. A driving unit drives rotation of the cutting unit. A control unit controls the driving unit to drive rotation of the rotating shaft upon detecting that the relative movement between the mounting frame and the cutting unit is permitted. The control unit shuts off the driving unit upon detecting that the relative movement between the mounting frame and the cutting unit is restrained.

5 Claims, 5 Drawing Sheets

CUTTING APPARATUS FOR A MACHINE TOOL

BACKGROUND OF THE INVENTION

1. Field of the Invention

The invention relates to a cutting apparatus, more particularly to a cutting apparatus for use in a machine tool.

2. Description of the Related Art

In machining a polygonal rod, i.e., a rod with a polygonal cross-section, a workpiece is first turned by a lathe to form into a circular rod, and then machined by a polygonal turning machine to form the polygonal rod.

During the turning operation of the lathe, the workpiece is first held and rotated by a chuck. Then a lathe tool is operated to advance in both radial and axial directions of the workpiece to cut the workpiece, such that a circular rod that has a desired diameter and a desired length is formed at the machined portion of the workpiece.

In the forming process of the polygonal rod, the workpiece is held and rotated by a chuck of the polygonal turning machine. Then a polygonal cutter that rotates in a rotational direction the same as that of the workpiece is operated to cut the workpiece into the polygonal rod.

However, the removal of the workpiece from the lathe and the loading of the same on the polygonal turning machine are time-consuming and may affect the machining precision.

Another conventional machine tool is equipped with a lathe tool and a separate polygonal cutter to respectively perform turning and polygonal turning operations. However, in the machining process of the polygonal rod, the lathe tool and polygonal cutter need to be positioned relative to the workpiece in turn. As a result, the machining precision may still be affected.

SUMMARY OF THE INVENTION

Therefore, the object of the present invention is to provide a cutting apparatus for a machine tool that can serve as a lathe tool and a polygonal cutter.

Accordingly, a cutting apparatus of the present invention is adapted for use in a machine tool. The cutting apparatus includes a mounting frame, a cutting unit, a locking unit, a driving unit and a control unit. The cutting unit includes a rotating shaft that is mounted in the mounting frame, and that extends along and is rotatable about an axis, and a cutter assembly that is connected co-rotatably to an end of the rotating shaft along the axis. The locking unit includes a first locking piece that is connected immovably to the mounting frame and that has a first engaging portion, a second locking piece that is connected co-rotatably to the rotating shaft of the cutting unit and that has a second engaging portion, and a latch assembly that surrounds the rotating shaft and that is movable along the axis between a locked position and an unlocked position. The latch assembly engages the first and second engaging portions at the locked position to restrain the rotating shaft from rotating relative to the mounting frame. The latch assembly is separated from the first and second engaging portions at the unlocked position such that the rotating shaft is rotatable relative to the mounting frame. The driving unit is mounted to the mounting frame for driving rotation of the rotating shaft of the cutting unit when the latch assembly is at the unlocked position. The control unit includes a sensor for generating a first signal upon detecting that the latch assembly is at the locked position, and for generating a second signal upon detecting that the latch assembly is at the unlocked position, and a controller that is coupled to the sensor and the driving unit, that controls the driving unit to drive rotation of the rotating shaft upon receipt of the second signal from the sensor, and that controls the driving unit to shut off upon receipt of the first signal from the sensor.

BRIEF DESCRIPTION OF THE DRAWINGS

Other features and advantages of the present invention will become apparent in the following detailed description of the preferred embodiment with reference to the accompanying drawings, of which.

DETAILED DESCRIPTION OF THE PREFERRED EMBODIMENT

Figure 1:
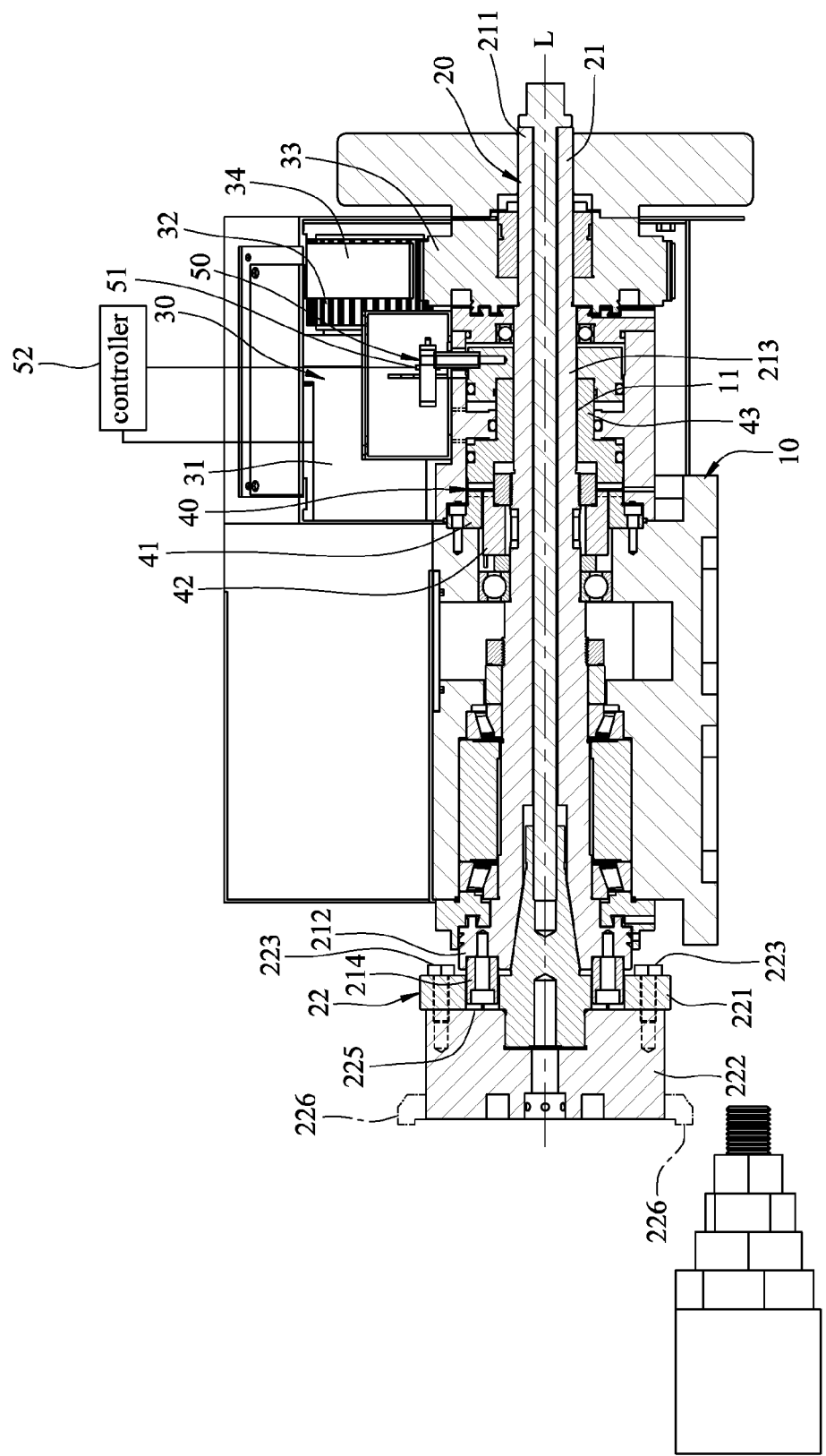
FIG. 1 is a schematic sectional view of a preferred embodiment of a cutting apparatus according to the invention, illustrating the preferred embodiment serving as a polygonal cutter.
Figure 2:
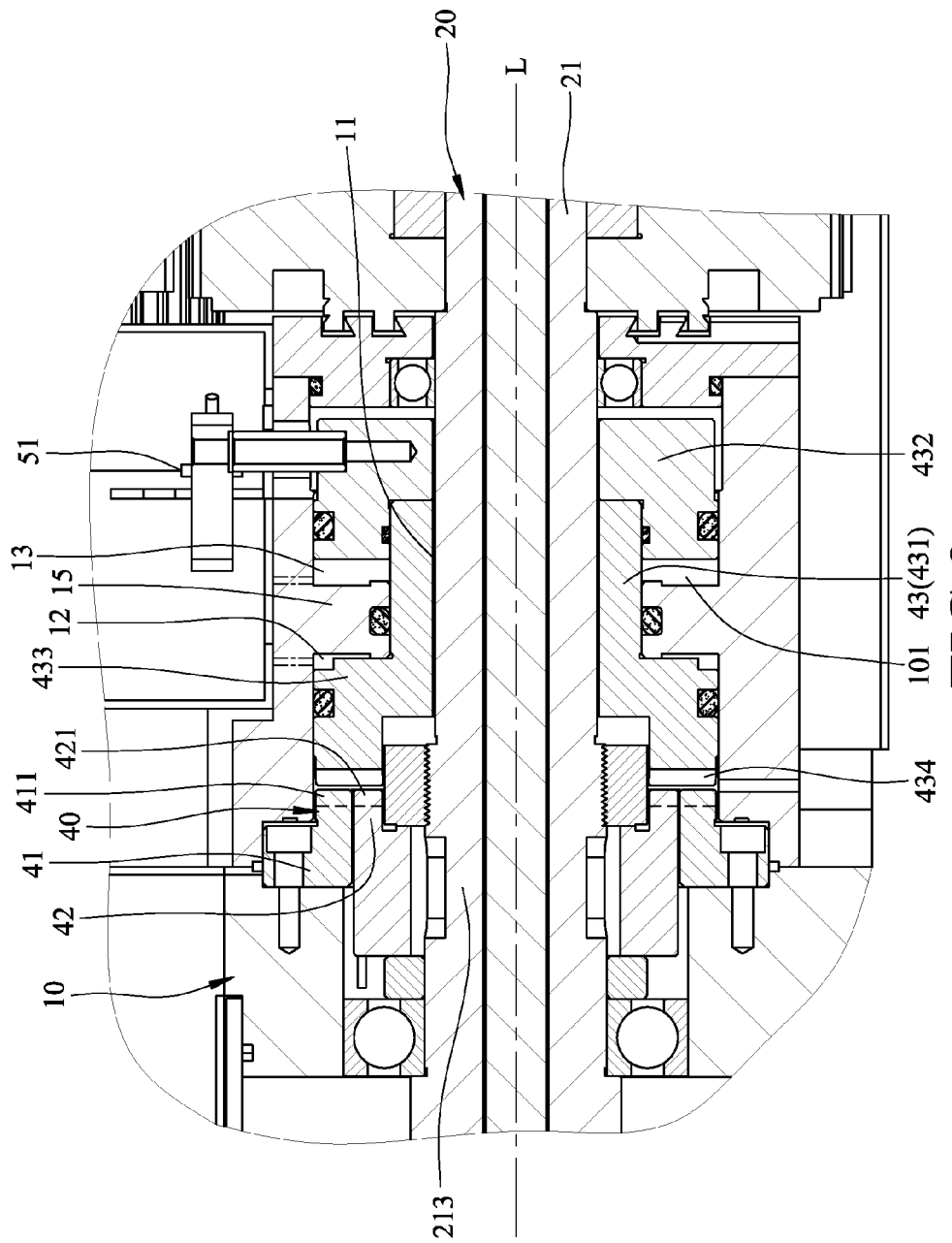
FIG. 2 is an enlarged fragmentary sectional view taken from FIG. 1, illustrating a latch assembly of the preferred embodiment at an unlocked position.

As shown in FIGS. 1 and 2, the preferred embodiment of a cutting apparatus according to the present invention is adapted for use in a machine tool, and includes a mounting frame 10, a cutting unit 20, a driving unit 30, a locking unit 40 and a control unit 50.

The mounting frame 10 has a shaft hole 11 that extends along an axis (L) and that is defined by a first inner surrounding surface, an annular retaining space 101 that extends radially and outwardly from the first inner surrounding surface and terminates at a second inner surrounding surface, and an inner flange 15 that extends radially and inwardly from the second inner surrounding surface. The inner flange 15 substantially divides the annular retaining space 101 into two annular retaining space portions.

The cutting unit 20 includes a rotating shaft 21 and a cutter assembly 22. The rotating shaft 21 extends along the axis (L) through the shaft hole 11 of the mounting frame 10, and is rotatable about the axis (L). The rotating shaft 21 has opposite first and second end portions 211, 212 along the axis (L), and a central portion 213 interconnecting the first and second end portions 211, 212. The second end portion 212 of the rotating shaft 21 is formed with a first positioning structure 214. In this embodiment, the first positioning structure 214 is configured as a plurality of columns.

Figure 3:
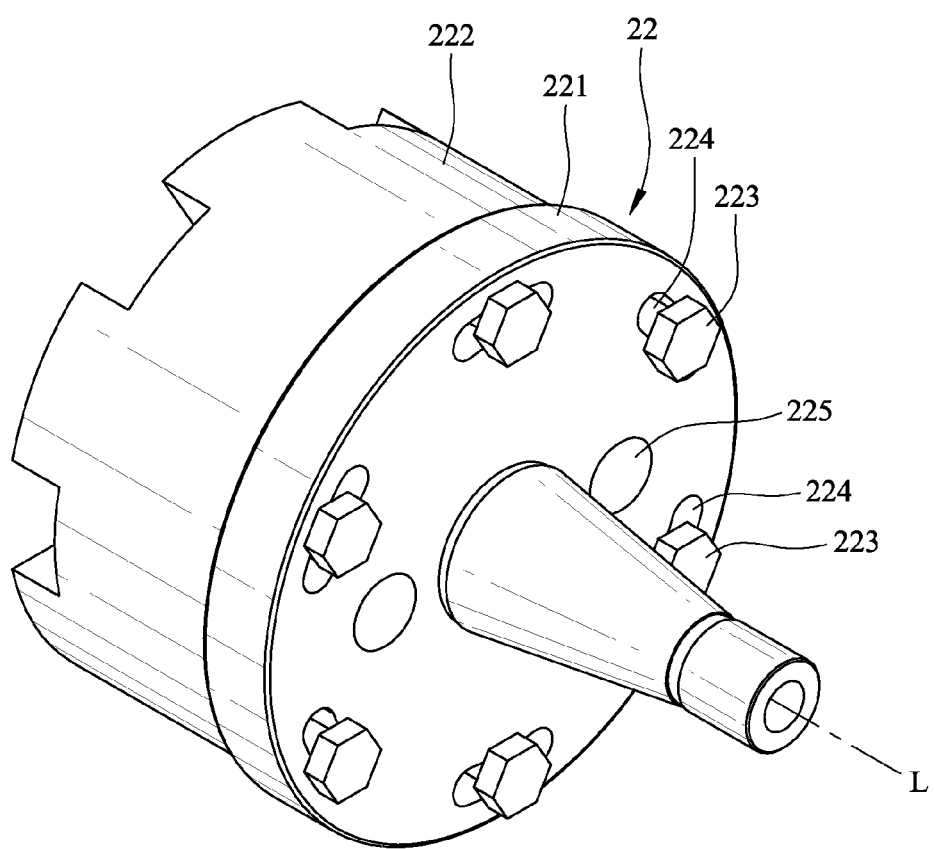
FIG. 3 is a perspective view of a cutter assembly of the preferred embodiment.

The cutter assembly 22 includes a base seat 221, a cutter seat 222 and a plurality of securing members 223. The base seat 221 is formed with a second positioning structure 225 and a plurality of angularly spaced-apart and circumferentially-extending through grooves 224 (see FIG. 3). In this embodiment, the second positioning structure 225 is configured as a plurality of holes that are engaged respectively with the columns of the first positioning structure 214 for connecting co-rotatably the base seat 221 to the rotating shaft 21.

The cutter seat 222 is connected to the base seat 221, and is mounted with a plurality of cutters 226.

The securing members 223 extend respectively through the through grooves 224 into the cutter seat 222 for securing the cutter seat 222 to the base seat 221. Once loosened, securing members 223 are slidable respectively along the through grooves 224 for permitting rotational displacement of the cutter seat 222 relative to the base seat 221. Therefore, a position of the cutter seat 222 relative to the base seat 221 can be adjusted.

The driving unit 30 is mounted to the mounting frame 10, and includes a motor 31, a driving pulley 32, a driven pulley 33 and a belt 34. The driving pulley 32 is connected co-rotatably to an output shaft of the motor 31. The driven pulley 33 is connected co-rotatably to the first end portion 211 of the rotating shaft 21. The belt 34 is trained on the driving and driven pulleys 32, 33 for transmitting power from the motor 31 to the rotating shaft 21.

The locking unit 40 includes a first locking piece 41, a second locking piece 42 and a latch assembly 43. The latch assembly 43 has a tubular wall segment 431 that surrounds the central portion 213 of the rotating shaft 21, and first and second flange segments 432, 433 that extend radially and outwardly from opposite sides of the tubular wall segment 431 along the axis (L), respectively. An outer surrounding surface of the tubular wall segment 431 is in slidable and fluid-tight contact with an inner periphery of the inner flange 15 of the mounting frame 10. The first flange segment 432 is disposed in one of the annular retaining space portions of the annular retaining space 101, and has a periphery in slidable and fluid-tight contact with the second inner surrounding surface of the mounting frame 10. The first flange segment 432 and the inner flange 15 of the mounting frame 10 cooperatively define a first fluid chamber 13 therebetween. The second flange segment 433 is disposed in the other one of the annular retaining space portions of the annular retaining space 101 that is distal from the first end portion 211 of the rotating shaft 21, and has a periphery in slidable and fluid-tight contact with the second inner surrounding surface of the mounting frame 10. The second flange segment 433 and the inner flange 15 of the mounting frame 10 cooperatively define a second fluid chamber 12 therebetween. The second flange segment 433 is formed with an annular engaging portion 434 facing away from the first flange segment 432.

The first locking piece 41 is ring-shaped, and is mounted immovably in the mounting frame 10. The first locking piece 41 is disposed at one side of the latch assembly 43 distal from the first end portion 211 of the rotating shaft 21, and is formed with a first engaging portion 411 facing the engaging portion 434 of the second flange segment 433.

The second locking piece 42 is ring-shaped, is surrounded by the first locking piece 41 (i.e., the first locking piece 41 surrounds the second locking piece 42), and is sleeved co-rotatably around the central portion 213 of the rotating shaft 21. The second locking piece 42 is formed with an annular second engaging portion 421 facing the engaging portion 434 of the second flange segment 433 and registered with the first engaging portion 411 of the first locking piece 41.

The latch assembly 43 is movable along the rotating shaft 21 between a locked position (see FIGS. 4 and 5) and an unlocked position (See FIGS. 1 and 2). The latch assembly 43 engages the first and second engaging portions 411, 421 at the locked position to restrain the rotating shaft 21 from rotating relative to the mounting frame 10. The latch assembly 43 is separated from the first and second engaging portions 411, 421 at the unlocked position such that the rotating shaft 21 is rotatable relative to the mounting frame 10.

The control unit 50 includes a sensor 51 and a controller 52. The sensor 51 is disposed on the latch assembly 43 for (generating a first signal upon detecting that the latch assembly 43 is at the locked position, and for generating a second signal upon detecting that the latch assembly 43 is at the unlocked position. The controller 52 is coupled to the sensor 51 and the motor 31 of the driving unit 30 for controlling the motor 31 upon receipt of the signals from the sensor 51.

Referring to FIGS. 1 and 2, when a hydraulic fluid is introduced into the first fluid chamber 13, the latch assembly 43 is actuated to move to the unlocked position. Then the controller 52 controls the motor 31 to drive rotation of the rotating shaft 21 and the cutter assembly 22 upon receipt of the second signal from the sensor 51. The preferred embodiment of the cutting apparatus therefore serves as a polygonal cutter for performing polygonal turning operation.

Figure 4:
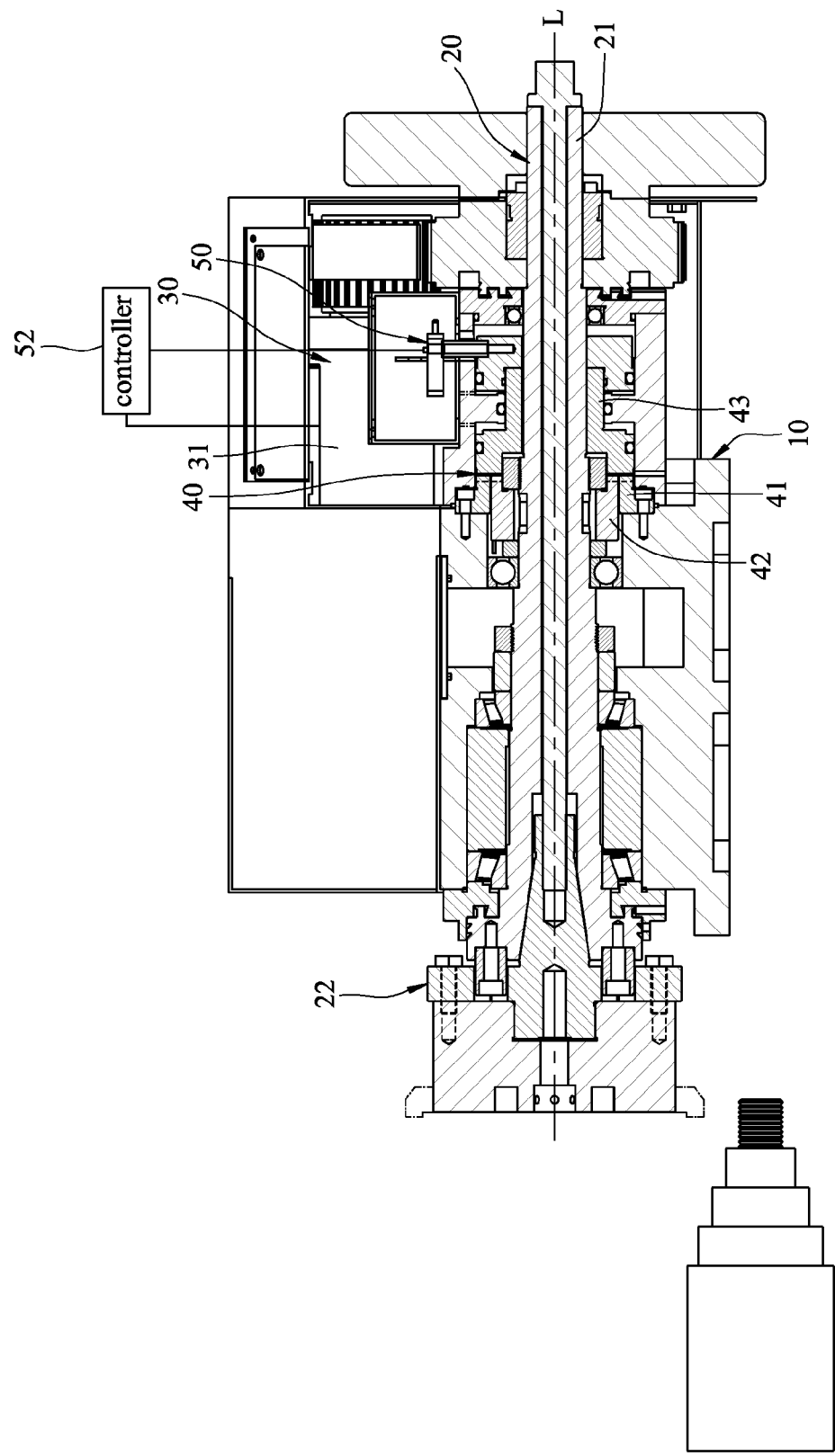
FIG. 4 is another schematic sectional view of the preferred embodiment, illustrating the preferred embodiment serving as a lathe tool.
Figure 5:
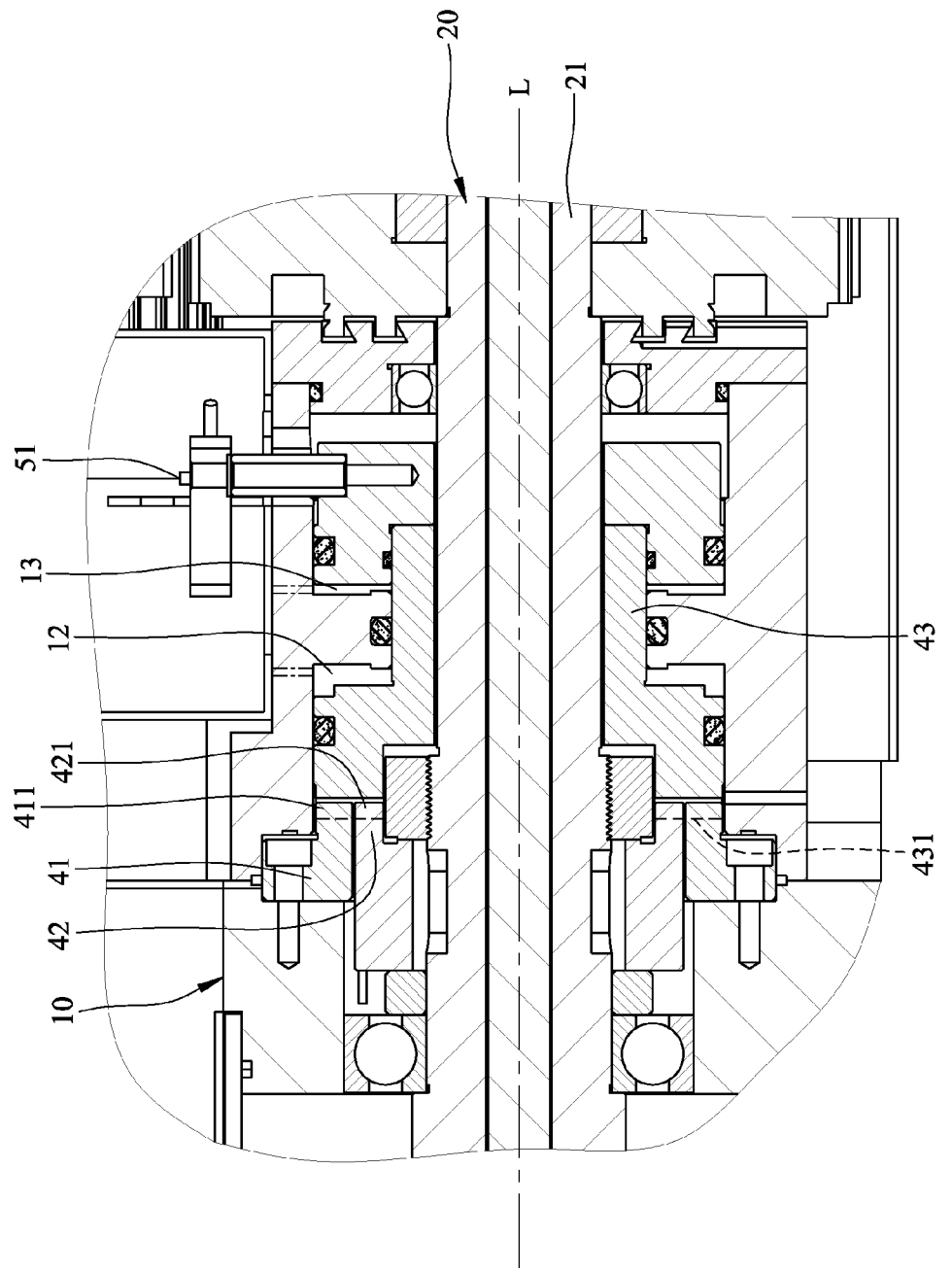
FIG. 5 is an enlarged fragmentary sectional view taken from FIG. 4, illustrating the latch assembly at a locked position.

Referring to FIGS. 4 and 5, when the hydraulic fluid is introduced into the second fluid chamber 12, the latch assembly 43 is actuated to move to the locked position. Then the controller 52 controls the motor 31 to shut down upon receipt of the first signal from the sensor 51. Since the latch assembly 43 engages the first and second engaging portions 411, 421 to restrain the rotating shaft 21 and the cutter assembly 22 from rotating relative to the mounting frame 10, the preferred embodiment of the cutting apparatus therefore serves as a lathe tool for performing turning operation.

To sum up, the cutting apparatus of the preferred embodiment according to this invention is capable of serving as a lathe tool and a polygonal cutter. During the machining process of a polygonal rod, the re-positioning action of cutters relative to a workpiece as with the prior art can be avoided. As a result, a machine tool using the cutting apparatus of the present invention has a better machining precision in comparison with the conventional machine tool.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

What is claimed is:

1. A cutting apparatus adapted for use in a machine tool, comprising:
   a mounting frame;
   a cutting unit including
      a rotating shaft that is mounted in said mounting frame, and that extends along and is rotatable about an axis, and
      a cutter assembly that is connected co-rotatably to an end of said rotating shaft along the axis;
   a locking unit including
      a first locking piece that is connected immovably to said mounting frame,
      a second locking piece that is connected co-rotatably to said rotating shaft of said cutting unit, and
      a latch assembly that surrounds said rotating shaft, and that is movable along the axis between a locked position where said latch assembly restrains said first and second locking pieces so as to prevent said rotating shaft from rotating relative to said mounting frame, and an unlocked position where said latch assembly is separated from said first and second locking pieces such that said rotating shaft is rotatable relative to said mounting frame;

a driving unit mounted to said mounting frame for driving rotation of said rotating shaft of said cutting unit when said latch assembly is at the unlocked position; and a control unit including a sensor for generating a first signal upon detecting that said latch assembly is at the locked position, and for generating a second signal upon detecting that said latch assembly is at the unlocked position, and a controller that is coupled to said sensor and said driving unit, that controls said driving unit to drive rotation of said rotating shaft upon receipt of the second signal from said sensor, and that controls said driving unit to shut off upon receipt of the first signal from said sensor.

2. The cutting apparatus as claimed in claim 1, wherein said cutter assembly includes a base seat connected co-rotatably to said end of said rotating shaft, and formed with a plurality of angularly spaced-apart and circumferentially-extending through grooves, a cutter seat connected to said base seat and mounted with a cutter, and a plurality of securing members extending respectively through said through grooves into said cutter seat for securing said cutter seat to said base seat, said securing members being slidable respectively along said through grooves when being loosened, so as to permit rotational displacement of said cutter seat relative to said base seat.

3. The cutting apparatus as claimed in claim 2, wherein:

said rotating shaft has a first positioning structure formed at said end thereof; and said base seat of said cutter assembly is further formed with a second positioning structure that is coupled to said first positioning structure so that said base seat is co-rotatable with said rotating shaft.

4. The cutting apparatus as claimed in claim 3, wherein said first positioning structure is configured as a plurality of columns, said second positioning structure being configured as a plurality of holes.

5. The cutting apparatus as claimed in claim 1, wherein:

said second locking piece is ring-shaped and is sleeved around said rotating shaft; and said first locking piece is ring-shaped and surrounds said second locking piece.

* * * * *